UNITED STATES PATENT OFFICE.

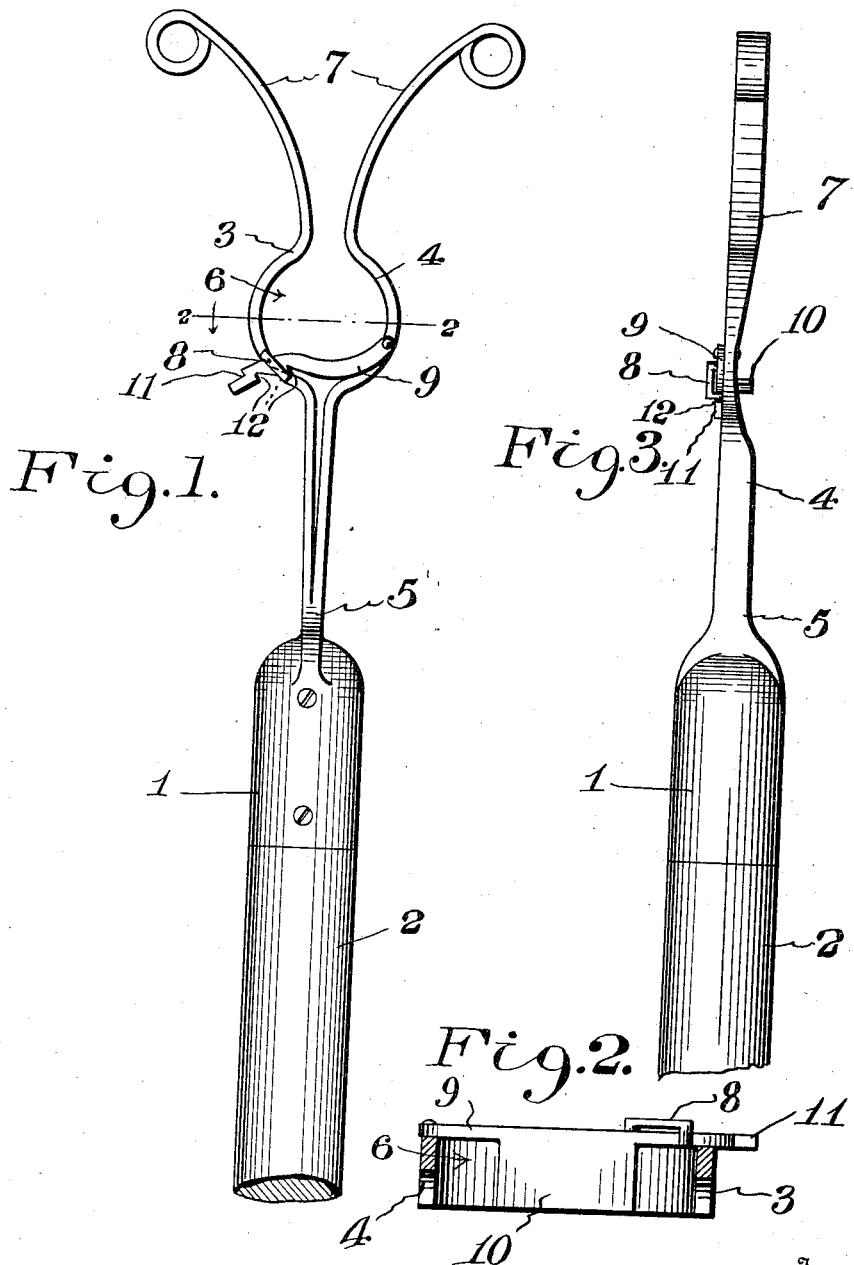

GEORGE D. McDONALD AND GEORGE H. LOCKETT, OF GLENROCK, WYOMING.

ANIMAL-CATCHER.

1,036,292.

Specification of Letters Patent.

Patented Aug. 20, 1912.

Application filed August 25, 1911. Serial No. 645,937.

*To all whom it may concern:*

Be it known that we, GEORGE D. McDONALD and GEORGE H. LOCKETT, citizens of the United States, residing at Glenrock, in the county of Converse, State of Wyoming, have invented certain new and useful Improvements in Animal-Catchers; and we do hereby declare the following to be a full, clear, and exact description of the invention, such as will enable others skilled in the art to which it appertains to make and use the same.

This invention relates to animal catchers, and has for its object to produce a device of this character with improved means for retaining the same upon the leg of the animal after once being placed thereon, thereby preventing said animal from kicking free.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings:—Figure 1 is a top plan view of the device. Fig. 2 is a sectional view on line 2—2 of Fig. 1. Fig. 3 is a side elevation of the device.

Referring to the drawing, the numeral 1 designates a ferrule, having a suitable handle 2 fitted therein in the usual manner.

The device proper consists of opposite spring jaws 3 and 4, respectively, the inner ends of which are suitably secured within the ferrule 1. The jaws are each formed near their inner ends with shanks 5 and are normally fitted flush against each other. It will be of course understood that the jaws are formed from suitable metal and are bent outwardly from the shanks 5 to form a loop 6 when said jaws are confronted. The jaws have their outer extremities 7 deflected outwardly so as to form an opening, and through which the leg of the animal passes during the operation of the device. To one of the jaws is suitably secured a keeper 8, and pivotally connected to the other jaw is a trigger 9, said trigger having its free end passing through the keeper 8. The trigger 9 is provided with an enlargement 10 to produce a flat broad surface for engagement with the leg of the animal to prevent injury thereto. The free end of the latch is formed with a shoulder 11, said shoulder resting against the keeper 5 when the jaws are in their spread position and ready for application upon the leg of the animal. The trigger 9 is further provided upon one of its edges with ratchet teeth 12 so that when the trigger 5 is sprung upon the leg of the animal and the jaws contracted the ratchet teeth will engage the keeper to prevent the animal from kicking free.

The operation of the device is as follows: The jaws are sprung apart until the shoulder 11 engages the keeper, and upon application of the device to the leg of an animal the trigger is operated by its contact with the leg so that the jaws spring together and any one of the ratchet teeth engages the keeper, thereby firmly holding the jaws in a locked position by the engagement of the enlargement with the leg and preventing the animal from kicking free.

It will be noted that the keeper 8 is U-shaped, thereby forming in effect a guideway for the trigger 9, the shoulder 11 and ratchet teeth engaging the opposite legs of said U-shaped keeper, respectively, to hold the jaws either in their clamped or unclamped position.

What is claimed, is:—

The combination in an animal catcher, of a pair of opposing spring jaws, said jaws being bowed outwardly intermediate their ends to produce a leg receiving loop, and curved at their free ends to produce a passage leading to said loop, a trigger pivoted to the bowed portion of one of the said jaws, and curved to form a continuation of said loop, a U-shaped keeper secured to the bowed portion of the other of said jaws to slidably receive the trigger, a shoulder formed upon one side of said trigger and ratchet teeth formed upon the other side of said trigger to engage the opposite legs of the U-shaped keeper to hold the jaws in their extended or retracted positions, and an enlargement formed upon the trigger and extending between said jaws to engage the leg of an animal, and by its engagement with said leg hold the ratchet teeth in engagement with the keeper thereby holding the jaws in their retracted position.

In testimony whereof, we affix our signatures, in presence of two witnesses.

GEORGE D. McDONALD.
GEORGE H. LOCKETT.

Witnesses:
CHAS. F. SMITH,
R. C. WYLAND.

Copies of this patent may be obtained for five cents each, by addressing the "Commissioner of Patents, Washington, D. C."